Patented July 13, 1937

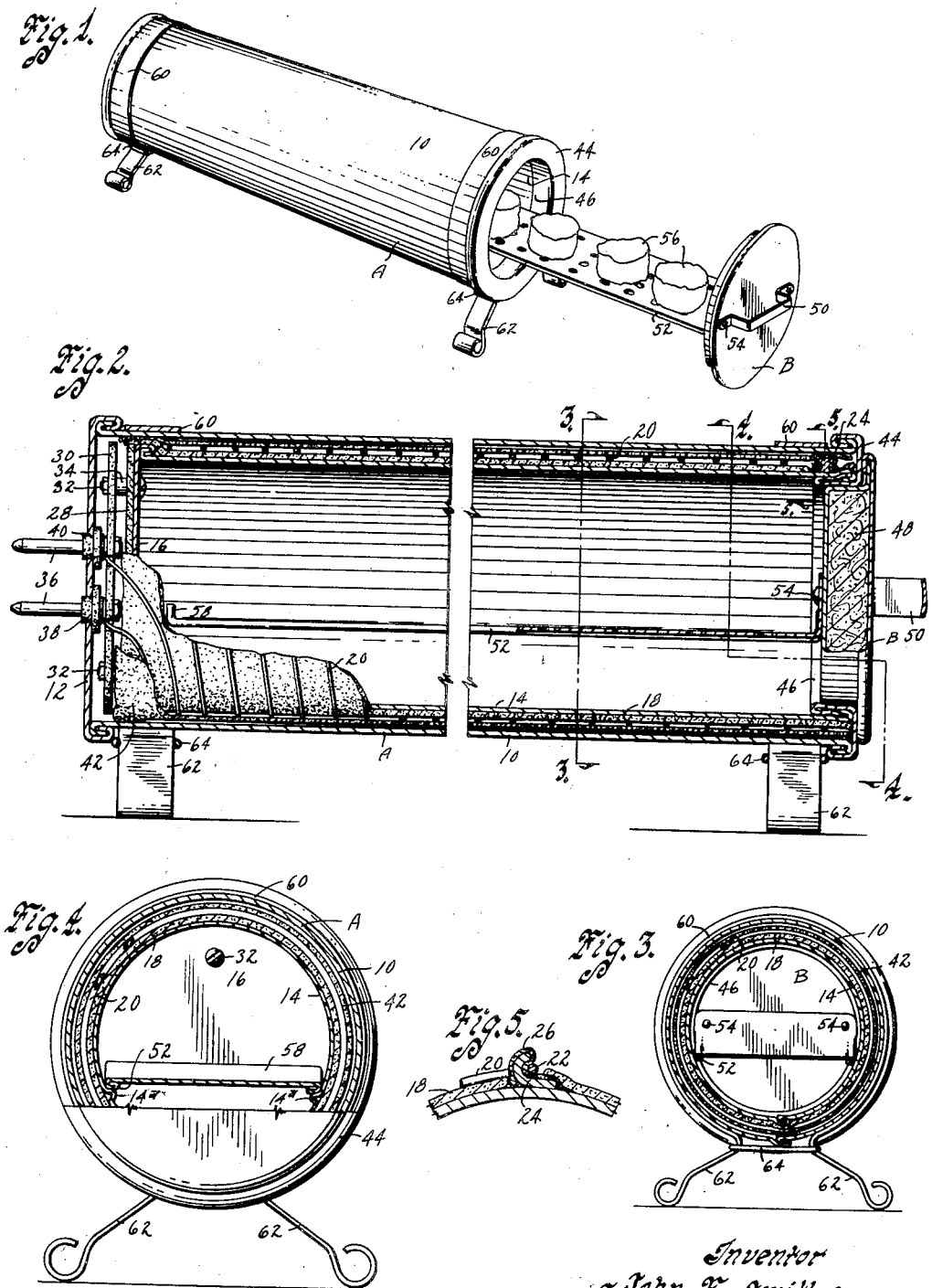

2,086,827

UNITED STATES PATENT OFFICE 2,086,827

BISCUIT BAKER OR OVEN

John E. Smith, Belleville, Ill., assignor to Knapp-Monarch Company, Belleville, Ill., a corporation of Missouri Application November 3, 1932, Serial No. 641,015

4 Claims. (Cl. 219—36)

An object of my invention is to provide a biscuit baker or oven of portable character and electrically heated whereby it may be conveniently supported on a table top or the like, the oven itself being comparatively simple and inexpensive to construct.

A further object is to provide an oven construction of tubular formation open at one end and having a closure member for the open end, a support for articles to be baked being supported on and carried by the closure member so that when the closure member is removed, the article support also will be removed and articles can be placed on or taken therefrom without reaching into the oven.

Still a further object is to provide the closure member frictionally engaged with respect to the oven so as to maintain the article support in a level position and maintain the oven effectively closed for efficient baking of the articles therein.

Still a further object is to provide a baking oven comprising an inner and an outer casing with a heating element between the casings, one end of the casings being closed and the other end open but adapted to be closed by a removable closure member which is of insulated construction to retain the heat within the oven.

Still a further object is to provide novel details of construction for a biscuit baker or oven as hereinafter more fully specified.

With these and other objects in view my invention consists in the construction, arrangement and combination of the various parts of my device, whereby the objects contemplated or attained, as hereinafter more fully set forth, pointed out in my claims, and illustrated in the accompanying drawing, in which:

Figure 1 is a perspective view of a biscuit baker or oven embodying my invention and showing the biscuit support partially extracted from the oven.

Figure 2 is an enlarged longitudinal vertical sectional view of the device in closed position.

Figure 3 is a sectional view on the line 3—3 of Figure 2.

Figure 4 is a sectional view on the line 4—4 of Figure 2 except that it shows a slightly modified construction; and Figure 5 is a sectional view on the line 5—5 of Figure 2 showing one of the constructional details of the heating element.

On the accompanying drawing, I have used the reference character A to indicate generally the oven and B the closure member therefor. The oven A has a cylindrical wall 10 and an end wall 12. Within the cylindrical wall 10, I provide an inner cylindrical wall 14 having an end wall 16. The parts 10 and 12 constitute an outer casing and the parts 14 and 16 constitute an inner casing.

The wall 14 is covered with insulating material 18 such as asbestos cloth. Wound on the insulation 18 is a heating element 20. It is of looped construction, the loop part thereof being indicated at 22.

The loop 22 is hooked over a hook-like projection 24 which is spot-welded or otherwise secured to the wall 14. It is covered with insulating material 26 so that the loop 22 is not short circuited with respect to the casing wall 14.

The outer end of the wall 16 is insulated as indicated at 28 and a supporting plate 30 of insulation is secured thereto by bolts 32 and spacers 34. Connector prongs 36 are supported on the plate 30. The ends of the looped heating element 20 are secured to the prongs 36 as best shown in Figure 2. Insulating bushings 38 surround the prongs 36 and are positioned in openings 40 formed in the end wall 12.

The heating element 20 is covered by insulation 42 such as sheet asbestos. In assembling, the inner casing, after being wound with the heating element 20 and the insulation 42, may be slid into the outer casing 10 until the prongs 36 extend through the openings 40. Thereafter a front end closure member 44 may be joined with the wall 10 to thus completely enclose the heating element between the inner and outer casings.

The member 44 has a bore 46 forming an opening for gaining access to the interior of the casing 14. The closure member B is preferably formed of sheet metal having insulation 48 therein as shown in Figure 2 to prevent the escape of heat from the baker. The closure member B is frictionally engaged in the bore 46.

For convenience in handling the closure member B, I provide a handle 50 secured to the outer surface of the closure member. Secured to the inner surface thereof is a biscuit support 52. It is secured as by rivets 54 to the closure member B.

It is adapted to support biscuits 56 or other articles to be baked in such manner that they can be inserted by manipulating the handle 50 and will be properly supported within the casing 14 by engagement of the sides of the member 52 with the wall 14. By securing the support 52 to the closure member B, the support can be conveniently removed from the baker A at the time the closure member B is removed and it is not necessary to reach into the oven or perform an extra operation of removing a support in order to get at the articles being baked so that they can be removed.

The normal tendency of the operator, of course, is to insert the support 52 in a level position. If it is desired to positively prevent the entrance of the support except in a level position, beads 14a may be formed along the wall 14 as shown in Figure 4 for the side edges of the support 52 to rest on. The support 52 preferably has a flange 58 at its inner end to prevent articles from falling off the end thereof.

For supporting the baker A, I provide metal straps 60 partially encircling the casing 10 and diverging as at 62 to form supporting legs. Loop connectors 64 connect the converging ends of the legs together and retain the straps 60 in their encircling position with relation to the baker A.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a baker of the character described, an outer tubular casing having one end closed, an inner tubular casing having one end closed, inner insulation, a heating element and outer insulation on the exterior of said inner tubular casing in successive layers, said inner tubular casing, inner insulation, heating element and outer insulation being telescopically received in said outer casing, the closed end of said outer casing having a pair of perforations, terminal prongs for said heating element carried by said inner tubular casing and projecting through said perforations, a closure element for the open end of said inner casing and a support secured thereto and carried thereby and projecting into said inner casing when said closure element is in closed position.

2. In a baker of the character described, an outer tubular casing having one end closed, an inner tubular casing having one end closed, inner insulation, a heating element and outer insulation on the exterior of said inner tubular casing in successive layers, said inner tubular casing, inner insulation, heating element and outer insulation being telescopically received in said outer casing, the closed end of said outer casing having a pair of perforations, terminal prongs for said heating element carried by said inner tubular casing and projecting through said perforations, a closure element for the open end of said inner casing, a support secured thereto and carried thereby and projecting into said inner casing when said closure element is in closed position, and insulating sleeves on said terminal prongs having portions extending through said perforations and flanges inward of said portions to limit outward movement of said insulating sleeves.

3. In a baker of the character described, an outer tubular casing having one end closed, an inner tubular casing having one end closed, a heating element for said inner tubular casing, said inner tubular casing being telescopically received in said outer casing, the closed end of said outer casing having a pair of perforations, terminal prongs for said heating element carried by said inner tubular casing and projecting through said perforations, a closure element for the open end of said inner casing, a support secured thereto and carried thereby and projecting into said inner casing when said closure element is in closed position and insulating sleeves on said terminal prongs having portions extending through said perforations and flanges inward of said portions to limit outward movement of said insulating sleeves.

4. In a baker of the character described, an outer tubular casing having one end closed, an inner tubular casing having one end closed, a heating element for said inner tubular casing, said inner tubular casing being telescopically received in said outer casing, the closed end of said outer casing having a pair of perforations, terminal prongs for said heating element carried by said inner tubular casing and projecting through said perforations, a closure element for the open end of said inner casing, a support within said inner casing, and insulating sleeves on said terminal prongs having portions extending through said perforations and flanges inward of said portions to limit outward movement of said insulating sleeves.

JOHN E. SMITH.